(12) United States Patent
Hanslmeier et al.

(10) Patent No.: US 12,295,540 B2
(45) Date of Patent: May 13, 2025

(54) EFFICIENT FILTER CLEANING

(71) Applicant: Hilti Aktiengesellschaft, Schaan (LI)

(72) Inventors: Xaver Hanslmeier, Mauerstetten (DE); Svenja Muller, Friedberg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/082,169

(22) Filed: Dec. 15, 2022

(65) Prior Publication Data
US 2023/0114976 A1    Apr. 13, 2023

Related U.S. Application Data

(63) Continuation of application No. 16/762,423, filed as application No. PCT/EP2018/081735 on Nov. 19, 2018, now Pat. No. 11,564,543.

(30) Foreign Application Priority Data

Dec. 18, 2017 (EP) .................................. 17207958

(51) Int. Cl.
*A47L 9/20*    (2006.01)
*A47L 9/19*    (2006.01)
(Continued)

(52) U.S. Cl.
CPC .... *A47L 9/20* (2013.01); *A47L 9/19* (2013.01); *A47L 9/2821* (2013.01);
(Continued)

(58) Field of Classification Search
None
See application file for complete search history.

(56) References Cited

U.S. PATENT DOCUMENTS 8,510,904 B2   8/2013   Eckstein
10,426,305 B2  10/2019  Ebert et al.
(Continued)

FOREIGN PATENT DOCUMENTS

CN    2269180 Y    12/1997
CN    102413749 A   4/2012
(Continued)

OTHER PUBLICATIONS

International Search Report of PCT/EP2018/081735, dated Jan. 23, 2019.

*Primary Examiner* — Natasha N Campbell
*Assistant Examiner* — Pradhuman Parihar
(74) *Attorney, Agent, or Firm* — Davidson Kappel LLC

(57) ABSTRACT

A method for operating a vacuum cleaning appliance, having a filter element, a filter element cleaning device, a control device, a turbine, a first pressure sensor and a second pressure sensor. The method includes operating the vacuum cleaning appliance to suck in the air stream through the filter element; determining a first pressure reference value; measuring the pressure difference between the first and second pressure values; dedusting the filter element with the aid of the filter element cleaning device if the value of the pressure difference between the first and second pressure values reaches a first threshold value; determining a second pressure reference value after the end of the dedusting of the filter element; determining a difference value between the second and first pressure reference values; and dedusting the filter element if the difference value between the second and first pressure reference values reaches a second threshold value, or switching off the vacuum cleaning appliance if the difference value between the second and first pressure reference values reaches a third threshold value. A vacuum cleaning appliance for carrying out the method.

4 Claims, 3 Drawing Sheets

(51) Int. Cl.
  *A47L 9/28* (2006.01)
  *B01D 46/44* (2006.01)
  *B01D 46/46* (2006.01)
  *B01D 46/71* (2022.01)
(52) U.S. Cl.
  CPC .......... *A47L 9/2889* (2013.01); *B01D 46/446* (2013.01); *B01D 46/46* (2013.01); *B01D 46/71* (2022.01); *B01D 2279/55* (2013.01)

(56) References Cited

U.S. PATENT DOCUMENTS

| | | | |
|---|---|---|---|
| 10,874,969 B2 | 12/2020 | Hensel et al. | |
| 2008/0201898 A1* | 8/2008 | Charbonneau | A47L 9/2821 15/347 |
| 2017/0001136 A1 | 1/2017 | Hensel et al. | |

FOREIGN PATENT DOCUMENTS

| | | |
|---|---|---|
| CN | 106102536 A | 11/2016 |
| CN | 106175592 A | 12/2016 |
| CN | 106974589 A | 7/2017 |
| CN | 107249416 A | 10/2017 |
| DE | 202012003280 U1 | 4/2012 |
| DE | 202012003282 U1 | 4/2012 |
| DE | 102011015574 A1 | 10/2012 |
| EP | 2644073 A1 | 10/2013 |
| EP | 2644076 A1 | 10/2013 |
| WO | WO2015139751 A1 | 9/2015 |
| WO | WO 2015199415 A1 | 12/2015 |

\* cited by examiner

EFFICIENT FILTER CLEANING

This is a Continuation of U.S. patent application Ser. No. 16/762,423 filed on May 7, 2020, now published as US 2021-0212540 A1 on Jul. 15, 2021, which is a National Phase of PCT/EP2018/081735 filed on Nov. 19, 2018 and claims the priority to European Patent Application EP 17207958.4, filed on Dec. 18, 2017. All of the above are hereby incorporated by reference herein.

The present invention relates to a method for operating a vacuum cleaning appliance, in particular a vacuum cleaner, having a filter element, a filter element cleaning device, a control device, a turbine for sucking in an air stream through the filter element, a first pressure sensor and a second pressure sensor, wherein the first pressure sensor, for determining a first pressure value, is positioned upstream of the filter element in the flow direction, and the second pressure sensor, for determining a second pressure value, is positioned downstream of the filter element in the flow direction.

The invention also relates to a vacuum cleaning appliance for carrying out the method.

BACKGROUND

Vacuum cleaning appliances having a collection container, a filter element, a filter element cleaning device, a control device, a turbine for sucking in an air stream through the filter element, a first pressure sensor and a second pressure sensor are very widely known from the prior art. The filter element serves for filtering dirt particles out of an air stream which is sucked in by the vacuum cleaning appliance. The two pressure sensors upstream and downstream of the filter element serve for determining a pressure difference which can give information about the degree of soiling of the filter element. The fuller the filter element is filled with dirt particles from the sucked-in air stream, the greater the pressure difference value between the two pressure sensors.

The collection container serves for collecting dirt particles which are filtered out of the sucked-in air stream, and the turbine serves for generating the sucked-in air stream, by which dirt particles are picked up. The filter element known from the prior art is normally arranged in the sucked-in air stream between the collection container and the turbine of the vacuum cleaning appliance.

Filter element cleaning devices for automatic dedusting of the filter element are likewise already very widely known from the prior art. In this case, with the aid of a mechanical device, an impulse can be exerted on the filter element, whereby the dirt particles which have accumulated in the filter element are moved out of the filter element and into the collection container.

SUMMARY OF THE INVENTION

The methods already known from the prior art for automatic dedusting of the filter element in the vacuum cleaning appliance are mostly not very effective. The automatic detection of the degree of soiling of the filter element and the consequent dedusting attempt rarely result in a sufficiently cleaned filter element with which the suction process can be continued in a manner that is sufficient.

It is an object of the present invention to provide a method for operating a vacuum cleaning appliance and a vacuum cleaning appliance for carrying out the method with which the above-described problem can be solved and efficient dedusting of the filter element can be achieved.

The present invention provides a method for operating a vacuum cleaning appliance, in particular a vacuum cleaner, having a filter element, a filter element cleaning device, a control device, a turbine for sucking in an air stream through the filter element, a first pressure sensor and a second pressure sensor, wherein the first pressure sensor, for determining a first pressure value, is positioned upstream of the filter element in the flow direction, and the second pressure sensor, for determining a second pressure value, is positioned downstream of the filter element in the flow direction.

Provided according to the invention are the method steps of:
  operating the vacuum cleaning appliance to suck in the air stream through the filter element;
  determining a first pressure reference value according to the relationship of the first pressure value to the second pressure value;
  measuring the pressure difference between the first and second pressure values;
  dedusting the filter element with the aid of the filter element cleaning device when the value of the pressure difference between the first and second pressure values reaches a first predetermined threshold value;
  determining a second pressure reference value according to the relationship of the first pressure value to the second pressure value, after the end of the dedusting of the filter element;
  determining a difference value between the second pressure reference value and the first pressure reference value; and
  dedusting the filter element with the aid of the filter element cleaning device if the difference value between the second pressure reference value and the first pressure reference value reaches a second predetermined threshold value, or switching off the vacuum cleaning appliance if the difference value between the second pressure reference value and the first pressure reference value reaches a third predetermined threshold value.

In this way, efficient dedusting of the filter element can be achieved.

The present invention also provides a vacuum cleaning appliance for carrying out the method.

BRIEF DESCRIPTION OF THE DRAWINGS

In the figures, identical and similar components are denoted by the same reference signs. In the figures.

DETAILED DESCRIPTION

Figure 1:
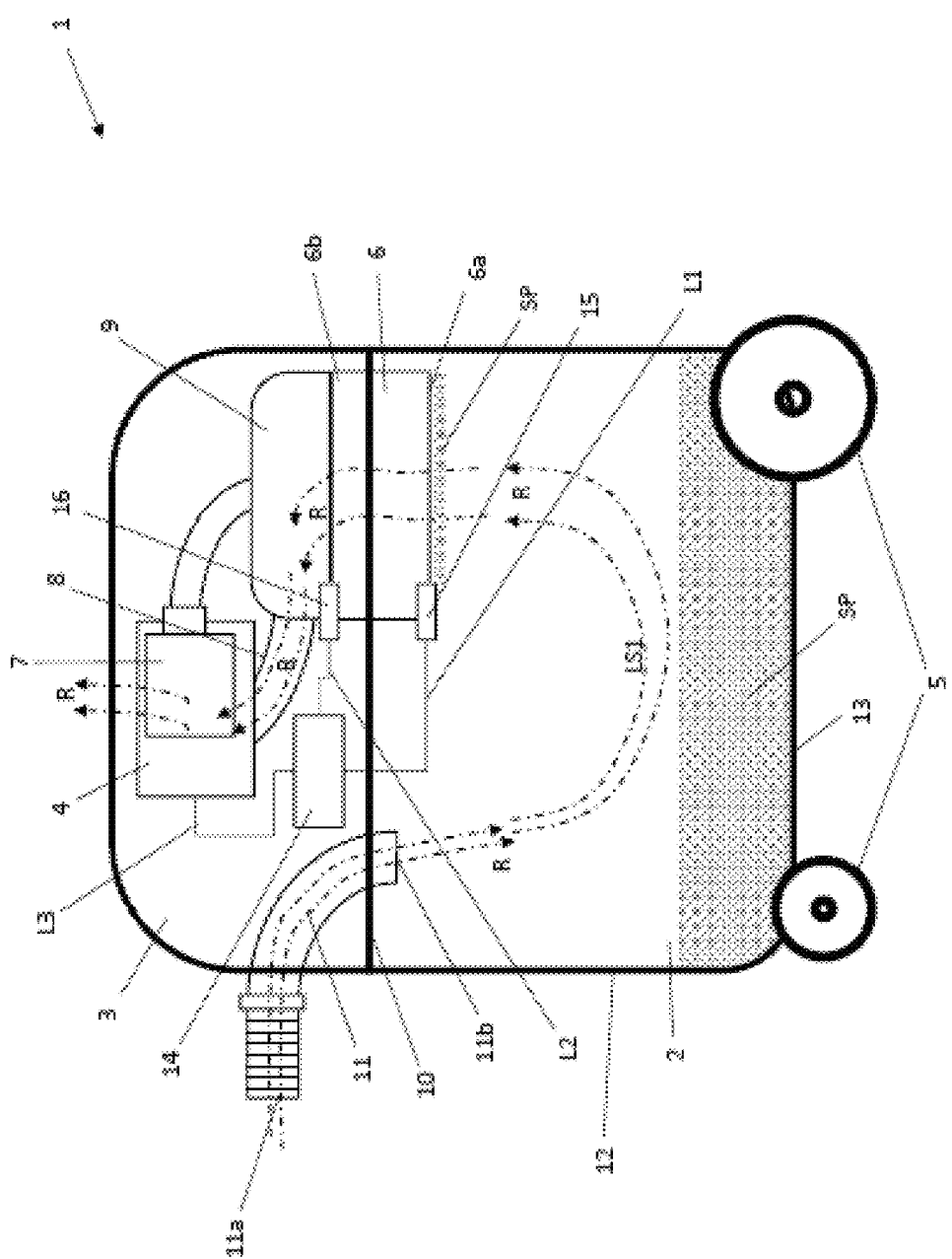
FIG. 1 shows a lateral sectional view of a vacuum cleaning appliance according to the invention which has a collection container, a suction head having a turbine and a filter element, wherein an air stream through the filter element that is sucked in by the turbine is indicated, and wherein dirt particles are filtered out of the air stream.

FIG. 1 shows an exemplary illustration of a vacuum cleaning appliance 1 in the form of a vacuum cleaner.

The vacuum cleaning appliance 1 contains substantially a collection container 2 and a suction head 3. The suction head 3 is positioned in a detachable manner on the collection container 2. A turbine 4 by which a negative pressure and consequently an air stream LS1 can be generated is positioned in the interior of the suction head 3. The air stream LS1, indicated in FIG. 1 by the broken arrows, flows in the flow direction R through an inlet tube 11, the collection container 2, a filter element 6 and to the turbine 4. The air stream LS1 then flows out of the suction head 3 again. The housing of the suction head 3 contains outflow openings for this purpose. The outflow openings are not illustrated in the figures.

Figure 2:
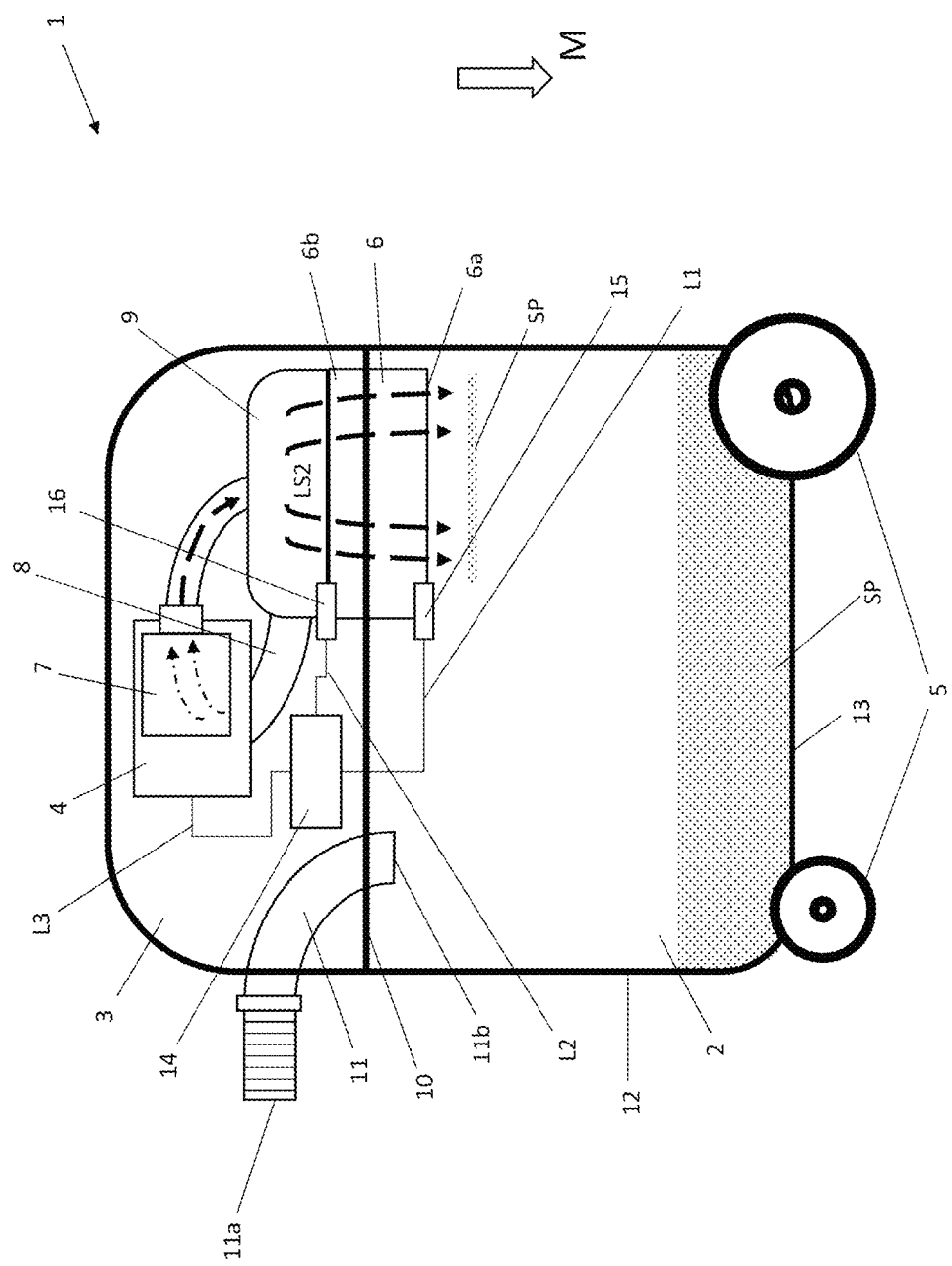
FIG. 2 shows a further lateral sectional view of the vacuum cleaning appliance according to the invention which has the collection container, the suction head having the turbine and a filter element, wherein an air stream through the filter element that is generated by the turbine, whereby the filter element is cleaned, is indicated.

The suction head 3 furthermore contains a filter element cleaning device 7, which serves for automatically cleaning the filter element 6. With the aid of the filter element cleaning device 7, it is substantially possible to direct an air stream LS2, in the form of one of more bursts of air, from the turbine 4 to the filter element 6 such that (as indicated in FIG. 2) the dirt particles SP which have accumulated in the filter element 6 drop into the collection container 2 in the arrow direction M and are stored there. The air stream LS1 generated by the turbine 4 and serving for sucking up dirt particles SP is briefly interrupted during the dedusting process with the filter element cleaning device 7.

The filter element 6 serves for filtering out and retaining dirt particles SP which are situated in an air stream LS1 flowing through the filter element 6.

As already mentioned previously, the suction head 3 contains a turbine 4 for generating a negative pressure. With the aid of the negative pressure, it is possible for ambient air to be sucked into the interior of the vacuum cleaning appliance 1 from outside the vacuum cleaning appliance 1. The turbine 4 is connected to a receiving device 9 for the filter element 6 via a feed tube 8. The receiving device 9 has substantially the shape and the outer volume of the filter element 6 and serves for receiving and holding the filter element 6.

Furthermore, the filter element 6 is positioned between the suction head 3 and the collection container 2. A parting plane 10 with a seal extends between the suction head 3 and the collection container 2.

Furthermore, the suction head 3 has an inlet tube 11 with a first end 11a and a second end 11b. The first end 11a of the inlet tube 11 is situated outside the suction head 3 and serves for receiving and holding a vacuum cleaner hose with a nozzle. The vacuum cleaner hose and the nozzle are not illustrated in the figures. The second end 11b of the inlet tube is directed toward the interior of the collection container 2. Through the second end tube 11b of the inlet tube 11, the sucked-in air stream LS1 flows into the interior of the collection container 2.

The collection container 2 contains substantially an encircling wall surface 12 and a bottom 13. Below the bottom 13, provision is made of wheels 5 for the mobility of the vacuum cleaning appliance 1. The encircling wall surface 12 and the bottom 13 form a cavity. The cavity of the collection container 2 serves for collecting and retaining dirt particles SP which are picked up with the aid of the sucked-in air stream LS1.

Furthermore, the suction head 3 contains a control device 14 and also a first pressure sensor 15 and a second pressure sensor 16. The first and second pressure sensors 15, 16 may also be referred to as air pressure sensors. As indicated in FIGS. 1 and 2, the first pressure sensor 15 is positioned at a first end 6a of the filter element 6. The second pressure sensor 16 is positioned at a second end 6b of the filter element 6. Here, the first end 6a of the filter element 6 corresponds to the inlet end of the filter element 6, and the second end 6b corresponds to the outlet end of the filter element 6. Here, the sucked-in air stream LS1 enters the filter element 6 through the inlet end and exits the filter element 6 again through the outlet end. The first pressure sensor 15 serves for determining a first pressure value upstream of the filter element 6 in the flow direction R or at the first end 6a of the filter element 6. By contrast, the second pressure sensor 16 serves for determining a second pressure value downstream of the filter element 6 in the flow direction R or at the first end 6a of the filter element 6. Both the first pressure sensor 15 and the second pressure sensor 16 are correspondingly connected, via a first line L1 and a second line L2, to the control device 14, whereby the first pressure value detected by the first pressure sensor 15 and the second pressure value detected by the second pressure sensor 16 can be transmitted to the control device 14.

Furthermore, the control device 14 is connected to the turbine 4 via a line L3. The control device 14 serves for controlling and regulating all the essential processes and functions of the vacuum cleaning appliance 1, in particular of the suction head 3 and of the turbine 4. The control device 14 is also connected to an input and output device (also referred to as an MMI), by way of which a user can control the individual functions of the vacuum cleaning appliance 1. The input and output device is not illustrated in the figures.

Furthermore, the control device 14 contains a memory, a control and regulating unit and a processor. The control and regulating unit and the processor are designed in the form of a microcontroller (also referred to as an MCU). The memory, the control and regulating unit and the processor are not illustrated in the figures.

With the aid of the control device 14, the pressure values received from the first and second pressure sensors 15, 16 become store and are processed. Stored in the memory of the control device 14 as reference values are in particular predetermined threshold values.

Course of the Suction Process

For the purpose of operating the vacuum cleaning appliance 1, the vacuum cleaning appliance 1 is switched from a deactivation mode into an activation mode with the aid of the input and output device. In the deactivation mode, no air stream LS1 is sucked into the vacuum cleaning appliance 1. In the activation mode, by contrast, an air stream LS1 is sucked into the vacuum cleaning appliance 1.

At the beginning of the vacuum cleaning process, the filter element 6 is in new condition and unsoiled. It is also possible, however, that the filter element 6 already has a certain amount of soiling from a previous vacuum cleaning process.

For the purpose of sucking in an air stream LS1, the turbine 4 generates a negative pressure. As a result of the negative pressure, an air stream LS1 flows into the interior of the collection container 2 through the inlet tube 11. Dirt particles SP are taken with the air stream LS1 and are transported into the interior of the vacuum cleaning appliance 1.

The air stream LS1 flows through the collection container 2, through the first end 6a into the filter element 6 and through the second end 6b out of the filter element 6. In the filter element 6, the dirt particles SP are retained or accumulate at the inlet end (that is to say first end 6a) of the filter element 6 (cf. FIG. 1).

The first pressure sensor 15 detects the air pressure at the inlet end or at the first end 6a of the filter element 6 and transmits a first pressure value to the control device 14. The second pressure sensor 16 detects the air pressure at the outlet end or the second end 6b of the filter element 6 and transmits a second pressure value to the control device 14.

With the aid of the control device 14, the relationship of the first pressure value from the first pressure sensor 15 to the second pressure value from the second pressure sensor 16 is determined and a first pressure reference value is thus established.

During the operation of the vacuum cleaning appliance 1 or during the suction process, the first pressure value is continuously measured by the first pressure sensor 15 and the second pressure value is continuously measured by the second pressure sensor 16. It is also possible, however, for the first and second pressure values to be measured only at certain temporal intervals. Said intervals may be regular or irregular and be between 10 and 30 seconds.

Figure 3:
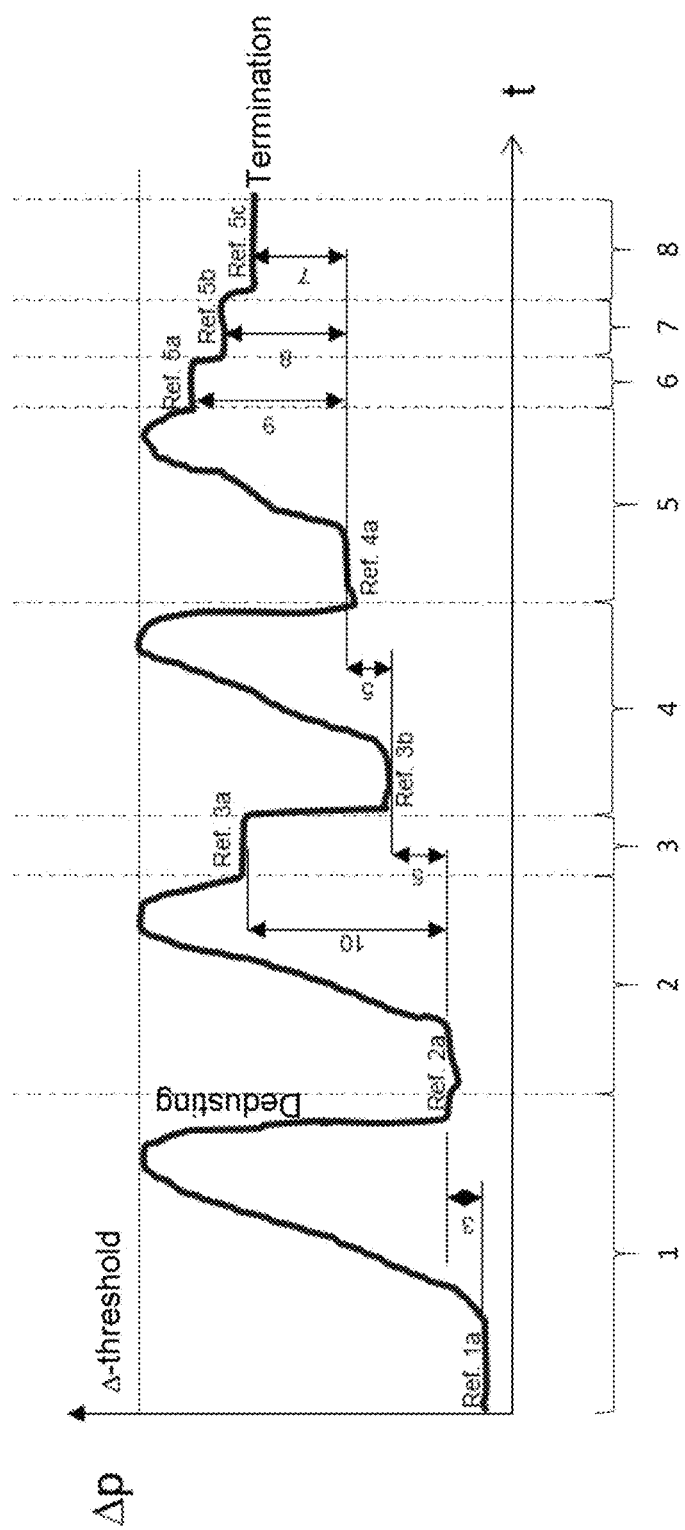
FIG. 3 shows a diagram which shows the development or the variation of the pressure relationship between a first and second pressure value during a suction process.

If, as shown in FIG. 3, the value of the pressure difference between the first and second pressure values has reached a first predetermined threshold value, the filter element 6 is cleaned with the aid of the filter element cleaning device 7. For this purpose, as described above, an air stream LS2 is, with the aid of the turbine 4, forced through the outlet end or the second end 6b of the filter element 6 in bursts. The dirt particles SP which accumulate in the filter element 6 during the suction process is thus forced out of the filter element 6 through the inlet end (cf. FIG. 2). For the dedusting of the filter element by the filter element cleaning device 7, the reversed air stream LS2 is in this case forced through the filter element in the arrow direction M in bursts either just once or else multiple times. The air stream LS2 is conducted through the filter element 6 either once or multiple times according to the degree of soiling of the filter element 6 and in dependence on the desired cleaning of the filter element 6. The functioning of the filter element cleaning device 7 corresponds here substantially to a filter element cleaning device known from the prior art.

After the end of the cleaning or dedusting of the filter element 6, a second pressure reference value is determined according to the relationship of the first pressure value to the second pressure value. For this purpose, the first pressure value at the inlet end or first end 6a of the filter element 6 is compared with the second pressure value at the outlet end or of the second end 6b of the filter element 6.

Subsequently, a difference value between the second pressure reference value and the first pressure reference value is determined.

If the difference value between the second pressure reference value and the first pressure reference value reaches a second predetermined threshold value, the filter element 6 is cleaned or dedusted with the aid of the filter element cleaning device 7.

If, however, the difference value between the second pressure reference value and the first pressure reference value reaches a third predetermined threshold value, the suction process is discontinued. The turbine 4 and consequently the entire vacuum cleaning appliance 1 are switched off. After replacement of the filter element 2, the vacuum cleaning process can be continued.

FIG. 3 shows a diagram in which, by way of example, the progression of the method according to the invention for dedusting the filter element 6 and in particular the development of the pressure reference values in relation to the first and second pressure sensors 15, 16 are illustrated. Here, the diagram illustrates the relationship of the pressure reference values Δp in relation to the course of time t. The pressure reference value Δp constitutes the relationship between the detected second pressure value from the second pressure sensor 16 and the detected first pressure value from the first pressure sensor 15.

The graphical profile shown in FIG. 3 is essentially subdivided into eight (1 to 8) phases.

The vacuum cleaning process begins with phase 1. In this case, the filter element 6 is in a new and unsoiled state. In this state, the air stream LS1 can flow relatively easily through the pores, which are still free, of the filter element 6, with the result that there is an only a small pressure difference between the second and first pressure values. The first pressure reference value Ref. 1a for the pressure difference between the second and first pressure values is accordingly small in the first phase. As can be seen in the diagram, the pressure difference between the second and first pressure values, and thus the pressure reference value (Δp), increases in the course of the vacuum cleaning process. The horizontal line in the diagram describes a first predetermined threshold value for the pressure reference value (Δp). When this first threshold value is reached, the above-described dedusting of the filter element 6 by the filter element cleaning device 7 occurs. After the end of the dedusting of the filter element 6 by the filter element cleaning device 7, the new pressure reference value (Δp) is at Ref. 2a and consequently slightly larger than the first pressure reference value (Δp) of Ref. 1a. The difference between Ref. 1a and Ref. 2a is 3 units. The reason for the increased pressure reference value (Δp) for Ref. 2a is that, even after being dedusted, the filter element 6 does not again have the same state as at the beginning of the vacuum cleaning process, when the filter element 6 was new and still unsoiled. The determined new pressure reference value Ref. 2a is however so small that the vacuum cleaning process can be continued with the existing filter element 6.

In phase 2, the first pressure reference value corresponds to Ref. 2a. In the further progression of the vacuum cleaning process, the filter element 6 is again filled with dust, with the result that less and less air can flow through the filter element 6. The difference between the second and first pressure values increases. The value for the pressure reference value (Δp) increases until the first threshold value is reached again. The filter element 6 is again dedusted by the filter element cleaning device 7. However, this dedusting of the filter element 6 is less efficient in phase 2 than in phase 1 since, after the end of the dedusting of the filter element 6, the second pressure reference value Ref. 3a is significantly larger than the first pressure reference value Ref. 2a. The numerical difference between Ref. 3a and Ref. 2a is 10 units and means that insufficient dedusting of the filter element. The numerical difference between Ref. 2a and Ref. 3a of 10 units exceeds a second predetermined threshold value, with the result that the filter element 6 is again dedusted by the by the filter element cleaning device 7 in phase 3. After the filter element 6 has been dedusted again, the difference between the pressure reference value Ref. 3b and the pressure reference value Ref. 3a is only 5 units. The fact that the numerical difference between Ref. 3b and Ref. 3a corresponds to 5 units only, and thus the second threshold value (=5 units) is no longer exceeded, means that sufficient dedusting of the filter element 6 has been provided. The vacuum cleaning process is continued with the slightly more soiled filter element 6.

As the diagram in FIG. 3 shows, the first pressure reference value in phase 4 corresponds to Ref. 3b. In the further progression of the vacuum cleaning process, the filter element 6 is again filled with dust, with the result that less and less air can flow through the filter element 6. The difference between the second and first pressure values, which are correspondingly measured by the second and first pressure sensors 15, 16, steadily increases. The value for the pressure reference value (Δp) increases until the first threshold value is reached again. After the filter element 6 has been dedusted again, the new pressure reference value Ref. 4a is determined. The numerical difference between the pressure reference value Ref. 4a and the first pressure reference value Ref. 3b (at the beginning of phase 4) is again 5 units. The fact that the numerical difference between Ref. 4a and Ref. 3b corresponds to 5 units only, and thus the second threshold value (=5 units) is no longer exceeded, means that sufficient dedusting of the filter element 6 has been provided. The vacuum cleaning process is continued with the slightly more soiled filter element 6.

The first pressure reference value in phase 5 corresponds to Ref. 4a. In the further progression of the vacuum cleaning process, the filter element 6 is again filled with dust, with the result that less and less air can flow through the filter element 6. The difference between the second and first pressure values, which are correspondingly measured by the second and first pressure sensors 15, 16, steadily increases. The value for the pressure reference value (Δp) increases until the first threshold value is reached again. After the filter element 6 has been dedusted again, the new pressure reference value Ref. 5a is determined. The numerical difference between the pressure reference value Ref. 5a and the first pressure reference value Ref. 4a (at the beginning of phase 5) is again 9 units. The fact that the numerical difference between Ref. 5a and Ref. 4a corresponds to more than 5 units, and thus the second threshold value (=5 units) is exceeded, means that sufficient dedusting of the filter element 6 has not been provided.

The filter element 6 is again dedusted by the by the filter element cleaning device 7 in phase 6. After this dedusting of the filter element 6, the numerical difference between Ref. 5b and Ref. 4a is still 8 units. The fact that the numerical difference between Ref. 5b and Ref. 4a still corresponds to more than 5 units, and thus the second threshold value (=5 units) is still exceeded, means that sufficient dedusting of the filter element 6 has still not been provided. The filter element 6 is thus dedusted again in phase 7. At the end of phase 7, a pressure reference value Ref. 5c is determined. The numerical difference between the pressure reference value Ref. 5c and the pressure reference value Ref. 4a is 7 units and thus still exceeds the second threshold value (=5 units).

Since sufficient cleaning of the filter element 6 can no longer be achieved, the vacuum cleaning appliance 1 is switched off at the end of phase 8. The vacuum cleaning process can be restarted by replacing the filter element 6, which is now too heavily soiled, with a new, unsoiled filter element 6.

OVERVIEW OF THE REFERENCE SIGNS

1 Vacuum cleaning appliance
2 Collection container
3 Suction head
4 Turbine
5 Wheels
6 Filter element
6a First end of the filter element
6b Second end of the filter element
7 Filter element cleaning device
8 Feed tube
9 Receiving device
10 Parting plane
11 Inlet tube
11a First end of the inlet tube
11b Second end of the inlet tube
12 Wall surface of the collection container
13 Bottom of the collection container
14 Control device
15 First pressure sensor
16 Second pressure sensor
LS1, LS2 Air stream
SP Dirt particles
L1 First line
L2 Second line
L3 Third line
R Flow direction of the sucked-in air stream

What is claimed is:

1. A method for operating a vacuum cleaning appliance having a filter, a filter element cleaner, a controller, a turbine for sucking in an air stream through the filter, a first pressure sensor and a second pressure sensor, wherein the first pressure sensor, for determining a first pressure value, is positioned upstream of the filter in a flow direction, and the second pressure sensor, for determining a second pressure value, is positioned downstream of the filter in the flow direction, the method comprising steps of: operating the vacuum cleaning appliance to suck in the air stream through the filter; measuring a pressure difference between the first and second pressure values and determining a first pressure reference value according to a relationship of the first pressure value to the second pressure value; further operating the vacuum cleaning appliance while monitoring the first pressure value and the second pressure value continuously or at regular intervals; dedusting in a dedusting phase the filter with the aid of the filter element cleaner when a pressure difference value of the pressure difference between the first and second pressure values reaches a first predetermined threshold value, the first predetermined threshold value being higher than the first pressure reference value; determining after the dedusting phase a second pressure reference value according to a relationship of the first pressure value to the second pressure value; and when a difference between the second pressure reference value and the first pressure reference value is at or below a second predetermined threshold value, continuing operating the vacuum cleaning appliance again while monitoring the first pressure value and the second pressure value continuously or at regular intervals and again dedusting the filter in a subsequent dedusting phase when the pressure difference value of the pressure difference between the first and second pressure values reaches the first predetermined threshold value, and when a difference between the second pressure reference value and the first pressure reference value is above the second predetermined threshold value, further dedusting the filter with the aid of the filter element cleaner as an additional dedusting in the dedusting phase.

2. The method as recited in claim 1, wherein the vacuum cleaning appliance is a vacuum cleaner.

3. The method as recited in claim 1, wherein after the additional dedusting a third pressure reference value according to a relationship of the first pressure value to the second pressure value is determined, the vacuum cleaning appliance being switched off when the difference value between the third pressure reference value and the first pressure reference value reaches a third predetermined threshold value.

4. A method for operating a vacuum cleaning appliance having a filter, a filter element cleaner, a controller, a turbine for sucking in an air stream through the filter, a first pressure sensor and a second pressure sensor, wherein the first pressure sensor, for determining a first pressure value, is positioned upstream of the filter in a flow direction, and the second pressure sensor, for determining a second pressure value, is positioned downstream of the filter in the flow direction, the method comprising steps of: operating the vacuum cleaning appliance to suck in the air stream through the filter; measuring a pressure difference between the first and second pressure values and determining a first pressure reference value according to a relationship of the first pressure value to the second pressure value; further operating the vacuum cleaning appliance while monitoring the first pressure value and the second pressure value continuously or at regular intervals; dedusting in a dedusting phase the filter with the aid of the filter element cleaner when a pressure difference value of the pressure difference between the first and second pressure values reaches a first predetermined threshold value, the first predetermined threshold value being higher than the first pressure reference value; determining after the dedusting phase a second pressure reference value according to a relationship of the first pressure value to the second pressure value; and determining that a difference between the second pressure reference value and the first pressure reference value is at or below a second predetermined threshold value, and continuing operating the vacuum cleaning appliance again while monitoring the first pressure value and the second pressure value continuously or at regular intervals and again dedusting the filter in a subsequent dedusting phase when the pressure difference value of the pressure difference between the first and second pressure values reaches the first predetermined threshold value; determining that a difference between the second pressure reference value and the first pressure reference value is above the second predetermined threshold value and further dedusting the filter with the aid of the filter element cleaner as an additional dedusting in the dedusting phase; determining a third pressure reference value according to a relationship of the first pressure value to the second pressure value after the further dedusting and determining that the third reference value is equal to or less than the second predetermined threshold value and continuing operating the vacuum cleaning appliance yet again while monitoring the first pressure value and the second pressure value continuously or at regular intervals and yet again dedusting the filter in a second subsequent dedusting phase when the pressure difference value of the pressure difference between the first and second pressure values reaches the first predetermined threshold value.

* * * * *